Patented July 17, 1934

1,967,176

UNITED STATES PATENT OFFICE 1,967,176

PROCESS FOR THE REMOVAL OF RESIDUAL POISONS FROM FRUITS AND VEGETABLES

Arthur M. Henry, Haddonfield, N. J., assignor to The Government and People of the United States of America No Drawing. Application May 14, 1927, Serial No. 191,535

5 Claims. (Cl. 146—219)

(Granted under the Act of March 3, 1883)

This application is made under the act of March 3, 1883, chapter 143 (22 Stat. 625), and the invention herein described and claimed may be used by the Government of the United States or any of its officers or employees in the prosecution of work for the Government, or by any citizen of the United States, without payment to me of any royalty thereon.

My invention relates to the employment of certain acids, or mixtures of such acids, or alternate employment of acids or alkalies or mixtures of such acids or alkalies, for the removal of spray residues and other deleterious matter from fruit and vegetables.

It is a well known fact in the fruit and vegetable industries that, in the protection of growing fruit and vegetables from insects and fungi and the diseases to which fruit and vegetables are subject, it is necessary to spray the same including the fruit trees and the vegetable plants with arsenicals and other insecticides and fungicides. The poisonous spray materials adhere to the surface of the fruits and the vegetables and if not removed prior to the marketing and the consumption of the same will injuriously affect the consumer.

I have found that arsenical spray residues may be removed from fruits and vegetables by subjecting the same to immersion in or a spray of strong acids, such as sulfuric acid, hydrochloric acid, nitric acid, etc. or to alternate treatment with such acids and alkalies such as ammonium hydroxide, sodium hydroxide, sodium carbonate, sodium bicarbonate, etc. The acids or alkalies are diluted with water to any desired extent prior to their application to the fruit or vegetables. The spray or immersion above referred to should be continued or maintained for a sufficient length of time to bring about a substantially complete removal of the poisonous residues on the fruits and vegetables. While I do not wish to limit myself to any specific proportions of acids or alkalies and water, the concentration that I have found most desirable for the purpose is a one per cent acid or alkali solution, or stated otherwise, 1 part by weight of acid or alkali and 99 parts by weight of water. It is to be understood that the acid or alkali may be diluted with water to any desired degree so long as the effective action of the acid or the alkali upon the residual poison is not interfered with and the proportions of water and acid or alkali may of course be varied under these conditions within wide ranges.

After subjection of the fruits or vegetables to the acid or acid and alkali spray or immersion above mentioned, the acid or acid and alkali, as the case may be, is removed by a water bath or spray. Upon completion of the washing operation which is continued of course for a sufficient length of time to effect the complete removal of the acid or alkali, the moisture contained on the surface of the fruit or vegetables is gotten rid or to any desired extent by natural or artificial means; the fruits and vegetables are then ready for the market.

Several examples of the practical operation of my process are set forth below.

Example 1.—Grapes coated with arsenical spray residue were washed with a one per cent solution of ammonia and then with a one per cent solution of sulfuric acid. The arsenic was removed from the grapes.

Example 2.—Arsenic was removed from grapes by washing the same with a one per cent solution of ammonia and then with a one per cent solution of hydrochloric acid.

Example 3.—Arsenical spray residue was removed from grapes by the application thereto of a single wash of a one percent solution of sulfuric acid.

Example 4.—Arsenical spray residue was removed from grapes by the application thereto of a single wash of a one per cent solution of hydrochloric acid.

Example 5.—Arsenical spray residue was removed from apples by washing the same with a one per cent solution of hydrochloric acid followed by rinsing in fresh water whereby the ammonia was gotten rid of and the apples were then dried. The same process was employed, using instead of hydrochloric acid, sulfuric acid and similar results were obtained as in the operation of the process with hydrochloric acid.

Example 6.—Arsenical spray residue was removed from cherries by immersing the cherries in a one-half per cent solution of hydrochloric acid.

Example 7.—Arsenical spray residues were removed from celery by the application thereto of dilute ammonia and dilute acids, respectively.

Example 8.—Arsenical spray residue on celery was removed by a single wash of ten per cent hot hydrochloric acid.

It is to be understood that in all of the above examples the acid or acid and alkalies employed for the removal of the residual poisons from the fruit or vegetables was followed by washing with water and subsequent drying.

I claim:

1. A process for the removal of residual poisons from fruits and vegetables comprising the subjection of such articles to a dilute solution of a strong acid.

2. A process for the removal of residual poisons from fruits and vegetables comprising the subjection of such articles to a dilute solution of a strong acid, then removing the acid by washing such articles in water, and subsequently freeing such articles from surface moisture.

3. A process for the removal of residual poisons from fruits and vegetables comprising the alternate subjection of such articles to a dilute solution of an alkali and a dilute solution of an acid.

4. A process for the removal of residual poisons from fruits and vegetables comprising the alternate subjection of such articles to a dilute solution of an alkali and a dilute solution of an acid, then removing the alkali and acid by washing such articles in water, and subsequently freeing such articles from moisture.

5. A process for the removal of residual poisons from fruits and vegetables comprising the subjection of such articles to a dilute solution of hydrochloric acid.

ARTHUR M. HENRY.